No. 856,295.
PATENTED JUNE 11, 1907.
H. U. PRINDLE.
CUTTING AND MIXING MILL.
APPLICATION FILED JUNE 26, 1905.
3 SHEETS—SHEET 2.
Fig. 4.
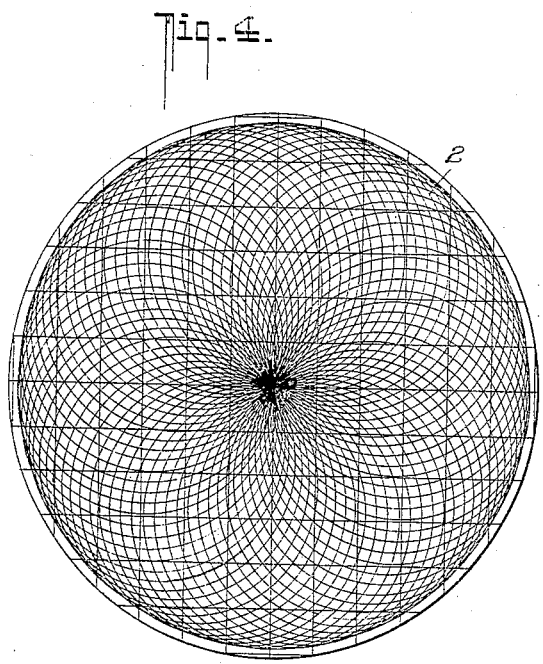
Fig. 5.
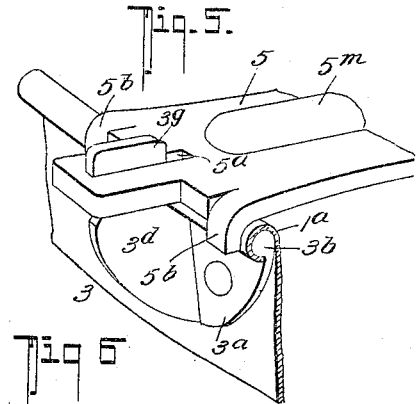
Fig. 6.
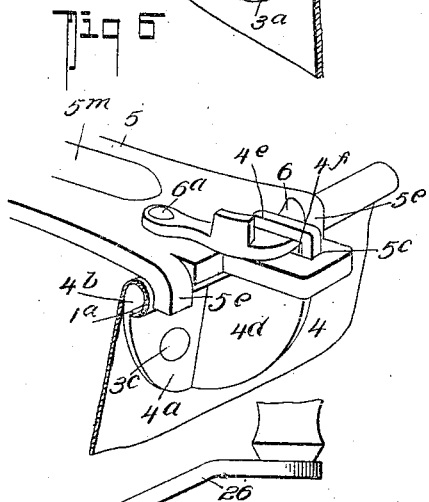
Fig. 7.
WITNESSES:
F. C. Gibson.
John D. Schrott.
INVENTOR
Henry U. Prindle.
BY
Fred G. Dieterich & Co.
ATTORNEYS

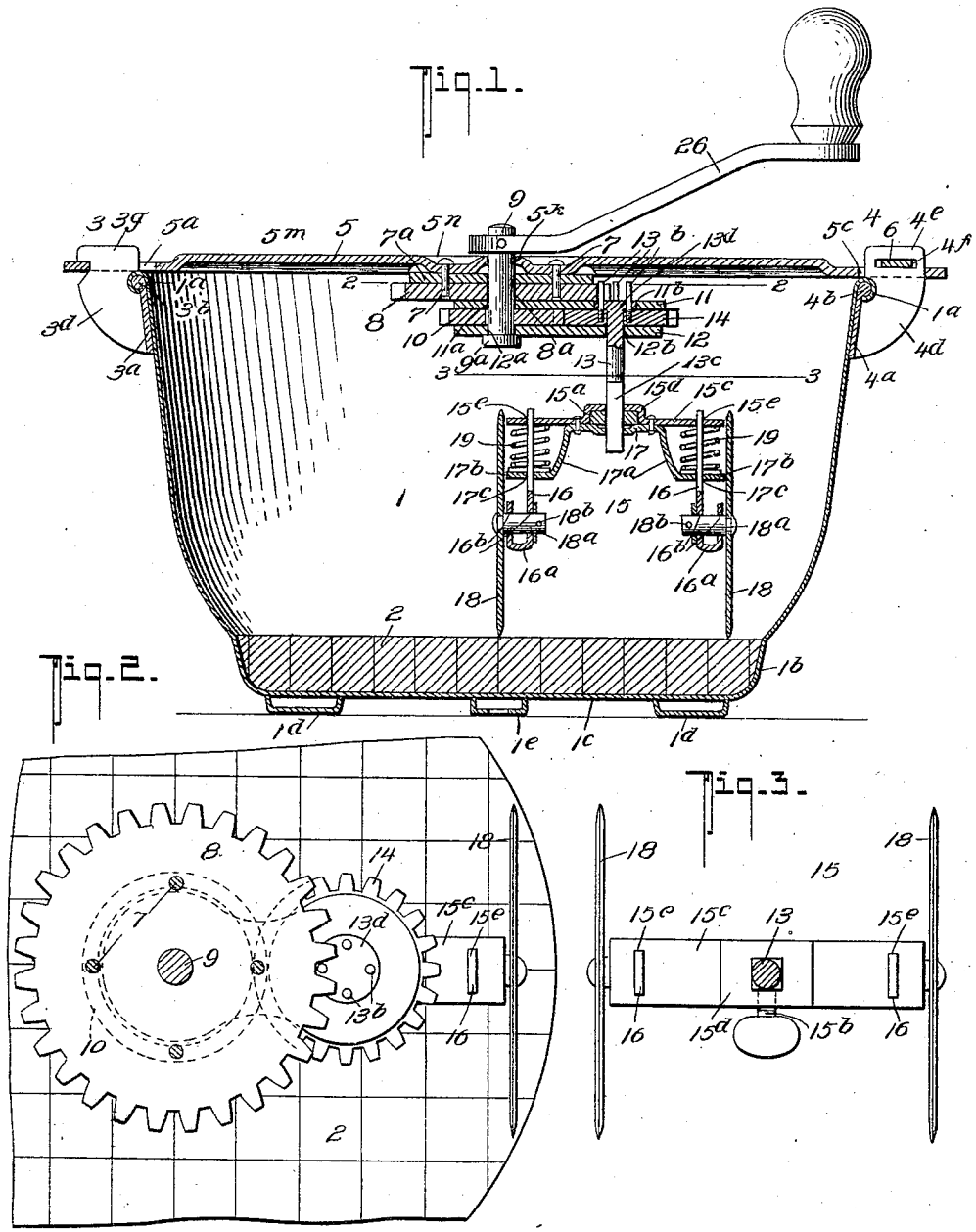

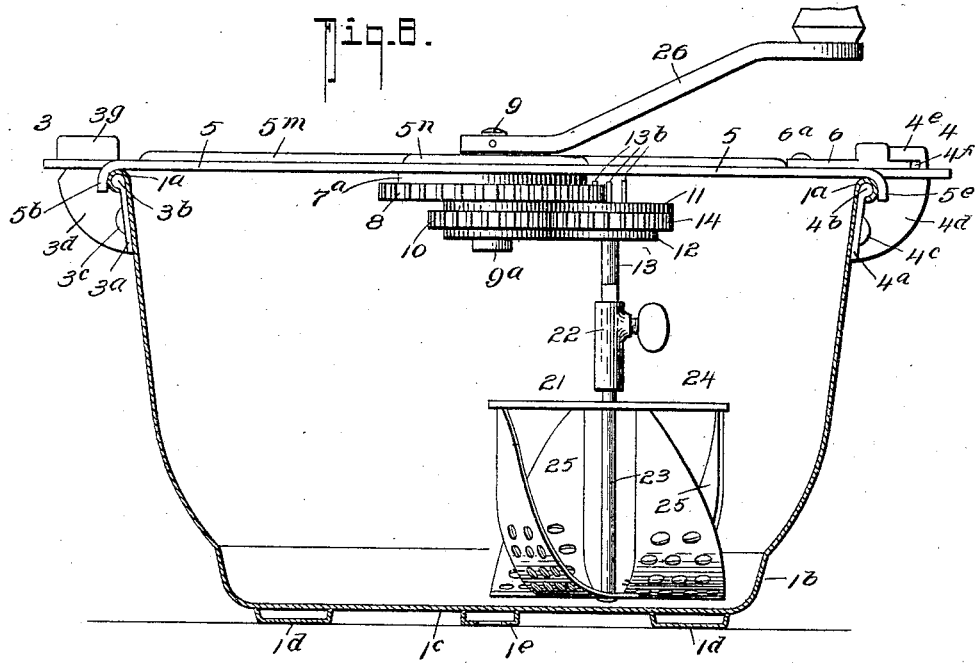

UNITED STATES PATENT OFFICE.

HENRY URSON PRINDLE, OF SAN FRANCISCO, CALIFORNIA, ASSIGNOR TO THE ROTARY MACHINE COMPANY, OF SAN FRANCISCO, CALIFORNIA, A CORPORATION.

CUTTING AND MIXING MILL.

No. 856,295.  Specification of Letters Patent.  Patented June 11, 1907.

Application filed June 26, 1905. Serial No. 267,048.

*To all whom it may concern:*

Be it known that I, HENRY URSON PRINDLE, residing at San Francisco, in the county of San Francisco and State of California, have invented certain new and useful Improvements in Cutting and Mixing Mills, of which the following is a specification.

My invention relates to improvements in that type of mills in which the cutting or mixing members are caused to revolve over the base or tray, about a vertical axis, and this invention seeks to provide a device of this character of a simple and inexpensive nature, in which the several parts are compactly arranged and capable of effecting a cutting or mixing action in an expeditious and thorough manner.

My invention also seeks to provide a device of this character which can be used either as a meat and vegetable cutter, as a dough mixer, or as a cream whipper, etc., and in its generic nature, the invention comprises a bowl or receptacle, a bottom therefor, a cross head detachably secured over the upper edge of the receptacle, a central rotatable shaft having a gear to turn therewith, a central fixed gear and a planetary gear adapted to mesh with the gear on the shaft and coöperate with the fixed gear, said planetary gear having a vertical shaft to which the cutter or dough mixing attachment or the cream whipper attachment is adapted to be secured.

My invention also includes certain novel construction of cutter devices, mixer attachments and whipper devices to be used with the driving mechanism of my complete mill.

Again, the invention comprises certain novel construction, combination and arrangement of parts, all of which will be first described in detail, and then specifically pointed out in the appended claims, reference being had to the accompanying drawings, in which:—

Figure 1, is a vertical section of my invention showing the same adapted for use as a meat and vegetable cutter. Fig. 2, is a horizontal section on the line 2—2 of Fig. 1. Fig. 3, is a horizontal section on the line 3—3 of Fig. 1. Fig. 4, is a diagrammatic view of the pan bottom, illustrating the path of movement of the cutter members. Fig. 5, is a detail view of one of the bridge member securing devices. Fig. 6, is a view similar to Fig. 5, of the other securing device. Fig. 7, is a vertical longitudinal section, illustrating my invention adapted for use as a dough mixer. Fig. 8, is a similar view showing the invention adapted for use as a cream whipper or beater. Fig. 9, is a perspective view of the whipping attachment. Fig. 10, is a plan view of the same.

Referring now to the accompanying drawings, in which like numerals and letters of reference indicate like parts in all of the figures, 1 designates the bowl or receptacle of pressed metal or other suitable material whose upper edge is provided with a turned over portion or bead $1^a$ and whose lower part $1^b$ is of a reduced diameter to receive the false bottom 2 which is preferably constructed of wooden sections with the grain running vertically. The receptacle 1 has its bottom $1^e$, below the false bottom 2, provided with "button" feet $1^d$—$1^d$ and a clamp receiving eye $1^e$, as shown.

Secured to the upper portion of the bowl or receptacle 1, is a clamp member 3 comprising a base part $3^a$ having an upper bead $3^b$ to fit into the bead $1^a$ of the bowl, and the base part $3^a$ is secured to the bowl by rivets $3^c$—$3^c$ as shown. $3^d$ designates a radial web having a T-head $3^g$ to enter and interlock with the slot $5^a$ in the cross or bridge member 5 which bridge member 5 has fingers $5^b$—$5^b$ adjacent the clamp member 3 to lap over the bead $1^a$ of the bowl on each side of the radial web $3^d$. Diagonally opposite the clamp member 3 is a second clamping member 4 having a base part $4^a$, a bead $4^b$ and a radial web $4^d$ similarly to the member 3. The member 4 is secured to the bowl by rivets $4^c$—$4^c$ as shown and its web $4^d$ has a projecting head $4^e$ to enter a second slot $5^c$ in the bridge member 5. The head $4^e$ is apertured as at $4^f$ to receive the end of the latch 6, which latch 6 is pivotally secured to the bridge member 5 by a rivet $6^a$, as shown. The bridge member 5 also has fingers $5^e$—$5^e$ to lap over the bead $1^a$ adjacent the member 4 and on each side of the radial web $4^d$. The bridge member 5 has a central "button" portion $5^g$ which is centrally apertured as at $5^k$ and which is surrounded by a circular bead or rib $5^n$, as shown. The bridge member 5 also has longitudinal ribs or beads $5^m$ stamped therein and the said bridge member 5 it should be observed is preferably formed of sheet metal. Secured centrally to the under-side of the bridge member 5 by rivets or bolts 7—7 is a fixed gear 8, which has a central aperture $8^a$ in alinement with the aperture $5^k$ of the bridge member 5, a spacing disk $7^a$ being interposed between the gear 8 and the bridge member 5.

9 designates a main shaft or spindle which projects through the apertures $5^k$ and carries a gear 10 which is keyed or otherwise secured thereto to turn with the shaft 9.

11—12 designate yoke members arranged one on each side of the gear 10 and provided with apertures $11^a$—$12^a$ to permit passage of the shaft 9 whose head $9^a$ engages the lower or under-side of the yoke 12.

13 designates a supplemental shaft held to rotate in bearing apertures $11^b$—$12^b$ in the yokes 11—12, which shaft 13 carries a planetary gear 14. The gear 14 meshes with the gear 10. The yoke 11 has its bearing aperture $11^b$ enlarged to receive the head disk $13^d$ of the shaft 13 which disk has gear engaging studs $13^b$—$13^b$ which pass through the disk into the gear 14 to secure the gear 14 to turn with the shaft 13. The shaft 13 is squared at its end as at $13^c$ to receive the cutter devices, the mixer attachment, or the beater or whipper attachment as will be presently explained.

15 designates the cutter attachment which comprises a supporting frame consisting of a socket plate $15^a$ securable to the shaft 13 by a set screw $15^b$, and a top plate $15^c$ having a U-shaped portion $15^d$ to receive the plate $15^a$ and which has its ends provided with transverse slots $15^e$—$15^e$ to receive the vertical plates 16—16. A bottom plate 17 is riveted to the top plate $15^c$ and has downwardly projecting arms $17^a$—$17^a$ whose ends $17^b$—$17^b$ extend parallel to the ends of the plate $15^c$ and have transverse slots $17^c$—$17^c$ in alinement with the slots $15^e$—$15^e$ in the plate $15^c$. The plates 16—16 also pass through the slots $17^c$—$17^c$ and the said plates 16—16 have their ends $16^a$—$16^a$ bent back into a U-shape and provided with bearing apertures $16^b$—$16^b$ to receive the stud spindles $18^a$—$18^a$ to which the rotary knives 18—18 are secured, pins $18^b$ serving to hold the spindles $18^a$—$18^a$ in their bearings.

19—19 designate coil springs surrounding the plates 16—16 between the top plate $15^c$ and the bottom plate 17 to press the cutter knives 18 downwardly against the false bottom 2.

20 designates the dough mixer attachment which comprises the socket $20^a$ to be secured to the shaft 13 by a set screw $20^b$ and which also includes the bifurcated arms $20^c$—$20^c$ which extend downwardly from the socket $20^a$, as shown. When the dough mixing attachment 20 is used the false bottom 2 is removed, see Fig. 7.

21 designates the cream whipper attachment which comprises a socket 22 and a spindle 23 projecting vertically downward therefrom. The baffle plate 24 is secured to the spindle 23 near the socket 22.

Secured to the bottom of the spindle 23 and to the baffle plate or disk 24 are a plurality of vanes or blades 25 of perforated sheet metal arranged in the manner clearly shown in Fig. 9. The false bottom 2 is removed when the whipper attachment 21 is used.

Secured to the main shaft 9 above the bridge member 5 is the driving means 26 which may be an ordinary handle as shown or which may be any other suitable power applying means such as any suitable form of motor geared with the shaft 9.

By reference to the drawings it will be seen that when my invention is used as a meat or vegetable cutter the main shaft 9 is turned, thereby imparting motion to the gear secured to the said shaft 9, which turns the gear secured to the shaft 13 and as the gear engaging studs of the shaft 13 engage the fixed gear secured below the bridge member 5, the movable or planetary gear will move around the gear on the shaft 9 in a circle imparting a planetary motion to the shaft 13 and the cutter knives carried thereby as shown diagrammatically in Fig. 4. When my invention is used as a bread mixer, the cutter knife attachment is removed and the dough mixing attachment 20 is secured in place on the shaft 13 and has, when the shaft 9 turns, a planetary motion imparted thereto. The same manner of operation takes place when the cream whipping attachment 21 is used, the baffle plate 24 serving to prevent splashing of the material to be whipped, beaten or mixed.

From the foregoing description, taken in connection with the accompanying drawings, it is thought the complete construction, operation, and many advantages of my invention will be readily apparent to those skilled in the art to which it appertains.

Having thus described my invention, what I claim and desire to secure by Letters Patent, is:—

1. An apparatus of the character stated, comprising a bowl or receptacle, a bridge member secured across the top thereof, means coöperating with the bridge member and the bowl for locking the bridge member to the bowl, a fixed gear and a spacing disk secured to the bridge member centrally thereof, a drive shaft passing through said bridge member and said fixed gear, a pair of yoke plates mounted on said drive shaft, a drive gear mounted on said drive shaft between said yoke plates, a supplemental shaft mounted in bearing apertures in said yoke plates, a planetary gear mounted on said supplemental shaft between said yoke plates and meshing with said drive gear, said supplemental shaft having a disk head held in the bearing aperture in the upper yoke plate, gear engaging lugs passing through said disk head into said planetary gear to secure the planetary gear to rotate with the supplemental shaft, said lugs adapted to mesh with the fixed gear, and means detachably secured to said supplemental shaft for operating upon the material within the receptacle.

2. An apparatus of the character stated, comprising a bowl or receptacle, a bridge member secured across the top thereof, means coöperating with the bridge member and the bowl for locking the bridge member to the bowl, a fixed gear and a spacing disk secured to the bridge member centrally thereof, a drive shaft passing through said bridge member and said fixed gear, a pair of yoke plates mounted on said drive shaft, a drive gear mounted on said drive shaft between said yoke plates, a supplemental shaft mounted in bearing apertures in said yoke plates, a planetary gear mounted on said supplemental shaft between said yoke plates and meshing with said drive gear, said supplemental shaft having a disk head held in the bearing aperture in the upper yoke, gear engaging lugs passing through said disk head into said planetary gear to secure the planetary gear to rotate with the supplemental shaft, said lugs adapted to mesh with the fixed gear means detachably secured to said supplemental shaft for operating upon the material within the receptacle, said last named means including a socketed member adapted to receive the end of said supplemental shaft and a set screw for securing the same to the supplemental shaft.

3. An apparatus of the class described, comprising a sheet metal bowl or receptacle having a reduced portion at its bottom, button legs on the bottom of said receptacle, a clamp receiving eye on the bottom of said receptacle, said receptacle having its upper edge provided with a turned over bead, a securing device consisting of a base plate riveted to the side of the receptacle and having a bead for entering the bead of the receptacle, said securing device including a radial web having a T head, a second securing device consisting of a base plate secured to the receptacle wall, and having a bead for entering the bead of the receptacle and a radial web having a projecting head portion provided with a slot, a bridge member having its ends slotted to pass over the head portion of said securing device and having fingers for locking over the bead of the receptacle adjacent the vertical webs of the securing devices, a latch pivoted to said bridge member and adapted to enter the slot in the second securing member radial web, said bridge member consisting of a sheet metal body having a longitudinal rib or bead formed therein, and a central apertured button portion, said bridge member having a circular rib or bead surrounding said central apertured button portion, a fixed gear and a spacing plate riveted to said bridge member, a main shaft passing centrally through the aperture in the bridge member and through the fixed gear and spacing plate, a pair of yoke plates mounted on said fixed shaft a drive gear mounted on said fixed shaft between said yoke plates and secured to said fixed shaft to rotate therewith, a planetary gear mounted between said fixed gears and meshing with said drive gear, a supplemental shaft passing through bearing apertures in the yoke plates and carrying said planetary gear, said supplemental shaft having a head disk held in the bearing aperture of one of said yoke plates, fixed gear engaging lugs passing through said disk head of the supplemental shaft into the planetary gear for securing the planetary gear to rotate with the supplemental shaft, and means for operating upon the material within the receptacle, detachably secured to said supplemental shaft substantially as shown and for the purposes specified.

4. An apparatus of the class described, comprising a sheet metal bowl or receptacle having a reduced portion at its bottom, button legs on the bottom of said receptacle, a clamp receiving eye on the bottom of said receptacle, said receptacle having its upper edge provided with a turned over bead, a securing device consisting of a base plate riveted to the side of the receptacle and having a bead for entering the bead of the receptacle, said securing device including a radial web having a T head, a second securing device consisting of a base plate secured to the receptacle wall, and having a bead for entering the bead of the receptacle and a radial web having a projecting head portion provided with a slot, a bridge member having its ends slotted to pass over the head portions of said securing devices and having fingers for locking over the bead of the receptacle adjacent the vertical webs of the securing devices, a latch pivoted to said bridge member and adapted to enter the slot of the second securing member radial web, said bridge member consisting of a sheet metal body having a longitudinal rib or bead formed therein and a central apertured button portion, said bridge member having a circular rib or bead surrounding said central apertured button portion, a fixed gear and a spacing plate riveted to said bridge member, a main shaft passing centrally through the aperture in the bridge member and through the fixed gear and spacing plate, a pair of yoke plates mounted on said fixed shaft, a drive gear mounted on said fixed shaft between said yoke plates and secured to said fixed shaft to rotate therewith, a planetary gear mounted between said fixed gears and meshing with said drive gear, a supplemental shaft passing through bearing apertures in the yoke plates and carrying planetary gears, said supplemental shaft having a head disk held in the bearing aperture of one of said yoke plates, fixed gear engaging lugs passing through said disk head of the supplemental shaft into the planetary gear for securing the planetary gear to rotate with the supplemental shaft, and an attachment of the character stated adapted to be detachably secured to said supplemental shaft, said attachment containing a socket and having a set screw for securing it to the supplemental shaft, a pair of plates straddling said socket, said plates having their ends apertured, supplemental plates in said last named apertures and having their ends bent into a U-shape, said U-shaped ends having bearing apertures, stud shafts held in said last named bearing apertures, cutting disks held on said shafts, and buffer springs mounted between said socket straddling plate ends for pressing the cutter members downwardly, and a false bottom for said receptacle against which the cutter members are pressed.

5. In an apparatus of the class described, a cutter member comprising a socket, a pair of plates adapted to straddle said socket and secured thereto, said plates having parallel ends spaced apart, said ends of said plates being apertured, supplemental plates passing through said apertures, buffer springs surrounding said supplemental plates between the ends of said straddling plates for pressing the supplemental plates in one direction, said supplemental plates having U-shaped ends provided with bearing apertures, radial cutting disks, and stud shafts secured to said radial cutting disks to pass through the bearing apertures in the U-shaped ends of said supplemental plates, substantially as shown and described.

HENRY URSON PRINDLE.

Witnesses:
EDW. A. McCANN,
R. F. ALLEN.